United States Patent [19]

Laurent

[11] 4,185,524
[45] Jan. 29, 1980

[54] LATHE FOR THE MACHINING OF HOLLOW WORKPIECES

[75] Inventor: Roland R. Laurent, Le Bourget, France

[73] Assignee: Cri-Dan, Paris, France

[21] Appl. No.: 943,680

[22] Filed: Sep. 19, 1978

[30] Foreign Application Priority Data

Sep. 19, 1977 [FR] France ................................ 77 28201

[51] Int. Cl.² .......................... B23B 3/18; B23B 21/00
[52] U.S. Cl. .......................................... 82/2 R; 82/25
[58] Field of Search .................... 82/2 R, 25; 408/157

[56] References Cited

U.S. PATENT DOCUMENTS

| 1,028,605 | 6/1912 | Potter | 82/2 R |
| 1,963,023 | 6/1934 | Libby | 82/25 |
| 2,388,265 | 11/1945 | Johnson | 82/25 |
| 3,124,985 | 3/1964 | Curtis et al. | 82/2 R |
| 3,187,611 | 6/1965 | Sweet | 82/25 |
| 3,937,110 | 2/1976 | Renoux | 82/25 |

FOREIGN PATENT DOCUMENTS

1444301  7/1976  United Kingdom ...................... 82/2 R

Primary Examiner—Leonidas Vlachos
Attorney, Agent, or Firm—Anthony J. Casella

[57] ABSTRACT

A lathe according to the parent patent application. Each tool-holder bar of a carriage is provided with a longitudinal channel whose opposite faces are parallel to said common plane and inside which there slidingly fits a heel provided on the corresponding tool-holder bar of the other carriage.

5 Claims, 4 Drawing Figures

LATHE FOR THE MACHINING OF HOLLOW WORKPIECES

BACKGROUND AND SUMMARY OF THE INVENTION

The subject invention relates to a lathe for the machining of hollow articles. In a patent to Renoux, U.S. Pat. No. 3,937,110, issued Feb. 10, 1976 and entitled "Lathe for Machining Hollow Parts", the assignee of said patent being the same as the assignee of the present invention, there is described a lathe for the inner machining of hollow workpieces of revolution comprising two carriages disposed symmetrically in relation to the rotational axis of the workpiece to be machined and capable of moving longitudinally and transversely in translation, parallel to a common plane passing through said axis, each of these carriages supporting at least one tool-holder bar which is designed so as to bear on the corresponding tool-holder bar of the other carriage, through the medium of at least one surface parallel to said common plane.

It is known that with such an arrangement, the tool-holder bars, bearing on each other, have no longer to support individually the cutting stress developed by their respective tool, as is the case with a conventional machine. They must simply withstand the torque resulting from the composition of two equal parallel forces opposite in direction, which completely changes the nature and the value of the stresses generated. Moreover, the reaction of the tools on the machined workpiece and the members of the machine which support it is also completely changed. Instead of a radial force tending to cause the spindle of the machine to bend, there only remains a torsional torque. These two effects together permit the section of chip removed at each pass to be considerably increased and, consequently, the speed of production to be increased in proportion.

In the above-mentioned patent, which is incorporated herein by reference, there are also described several variations of the invention and, particularly, different possible forms for the tool-holder bars.

The present invention has as its object an improvement of the tool-holder bars allowing the advantages of the above described invention to be obtained in a much simpler and also less costly way.

For this purpose, each tool-holder bar of a carriage is provided with a longitudinal channel whose opposite faces are parallel to said common plane and inside which of there slidingly fits a heel provided on the corresponding tool-holder bar of the other carriage.

Each bar may thus follow the transverse movement of the carriage with which it is integral, while bearing on the other bar through sliding bearing surfaces, this of course being within the limit of the transverse travel allowed by the relative dimensions of the channel and the heel.

Preferably, the opposite parallel faces of the channel are provided with longitudinal grooves for lubricating at a suitable pressure the sliding support between the bars. This lubrication may be effected for example by means of a tapping made in the tool spraying circuit.

Generally, each of the transverse carriages of the lathe will be equipped with a rotary turret supporting several tool-holder bars, e.g. three or four. In fact, numerous workpieces require more complex machining than simple boring and conical thread-cutting, which then requires tools of different shapes working successively.

In this case, and according to the present invention, the two turrets have a common rotational axis, one of these turrets being motive whereas the other, provided simply as a driven element, is rotated by means of the inter-bar connection.

Several embodiments of the subject invention are described hereafter by way of examples, with reference to the accompanying drawings in which.

DETAILED DESCRIPTION OF THE PREFERRED EMBODIMENTS

Figure 1:
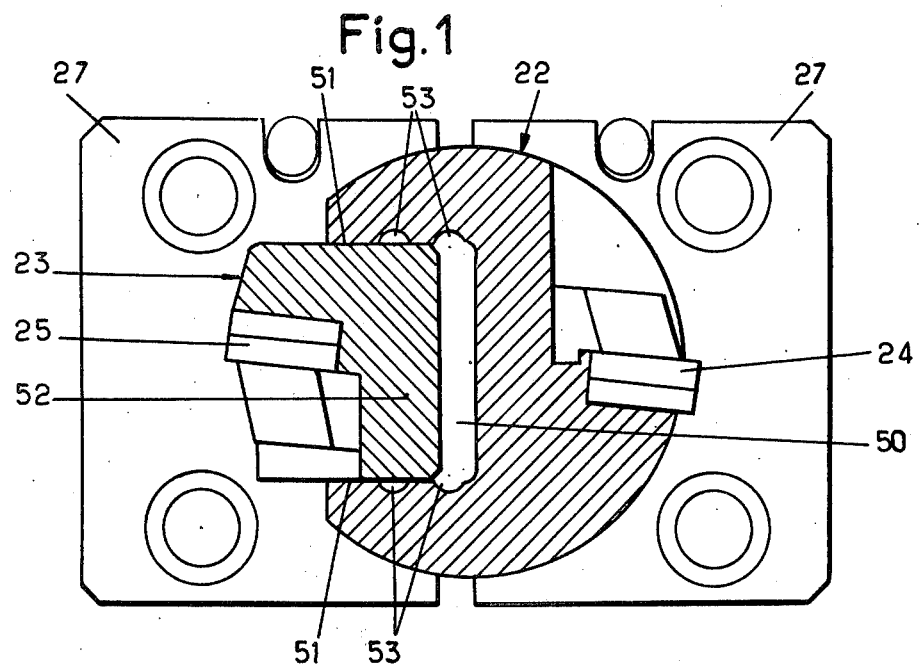
FIG. 1 is a cross-sectional view of two paired tool-holder bars according to the present invention.
Figure 2:
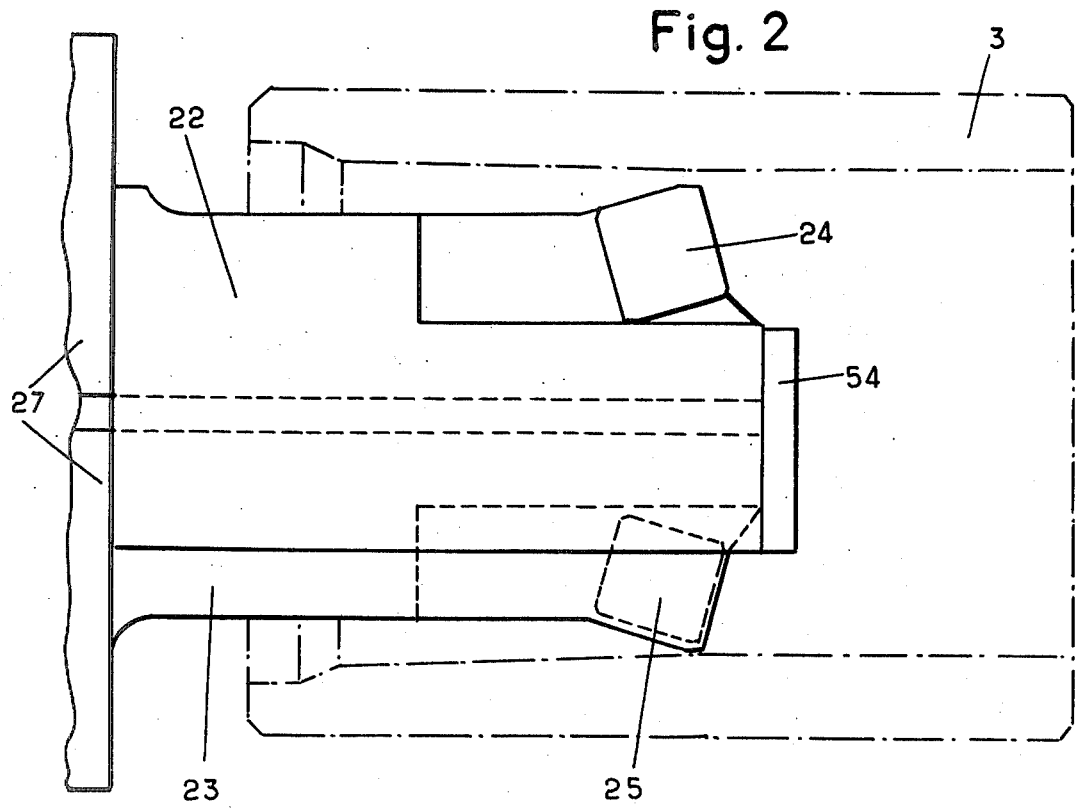
FIG. 2 is a top view of these tool-holder bars.

Referring first of all to FIGS. 1 and 2, there can be seen two tool-holder bars 22 and 23 which are provided at one of their ends with a housing capable of receiving a cutting tool, respectively 24 and 25, for the inner machining of a hollow workpiece of revolution such as that shown at 3 in FIG. 2. Each of these bars is fixed at its other end to a support such as 27 which is itself fixed by appropriate means to one of the transverse carriages of the lathe.

In accordance with the present invention, one of the bars, here bar 22, is provided with a longitudinal channel 50 with rectangular section whose opposite faces are parallel to the plane of translation of the longitudinal carriage. Inside channel 50 there slidingly fits a heel 52 which is provided on the other tool-holder bar 23, heel 52 having slide bearing surfaces 51.

The two bars 22 and 23 may thus move symmetrically in the transverse direction under the action of the carriages with which they are integral, without ceasing for all that to bear on each other through sliding bearing surfaces 51 which thus play the role of the surfaces 28 described in the above-mentioned patent. The amplitude of the possible transverse travel is naturally determined by the respective dimensions of channel 50 and heel 52 and depends here essentially in fact on the depth of the channel.

In accordance with the subject invention, there should be an accurate fit between the channel and the heel. Thus, the sliding bearing surfaces 51 should be lubricated under a suitable pressure. This lubrication may for example be achieved by means of longitudinal grooves such as 53 provided in face of the channel. Moreover, these grooves may be suitably fed under pressure with the liquid from the tool-spraying circuit, by way of an appropriate tapping.

Thus, the introduction of foreign bodies into the sliding bearing surfaces is avoided owing to the lubrication pressure. To this end, there is also provided a cover 54 which is fixed to one of the tool-holder bars so as to completely close off the open end of channel 50.

There will now be described, with particular reference to FIGS. 3 and 4, an application of the subject invention to a lathe equipped with rotary turrets. In this construction, the two transverse carriages 60 and 61 are located on each side of the turning axis represented by the hollow workpiece to be machined 3, and slide on the same transverse guide 62. On each of these carriages is mounted a rotary turret, respectively 62 and 64.

According to the present invention, the two turrets have a common axis of rotation. In other words, the axis of rotation of turret 63 is aligned with that of turret 64.

Each turret is provided with a flange, respectively 65 and 66, integral with the spindle of the turret and in which there is fixed, with centring, a tool-support, respectively 67 and 68, whose outer shape is determined by the number of tools to be mounted on the turret.

Figure 3:
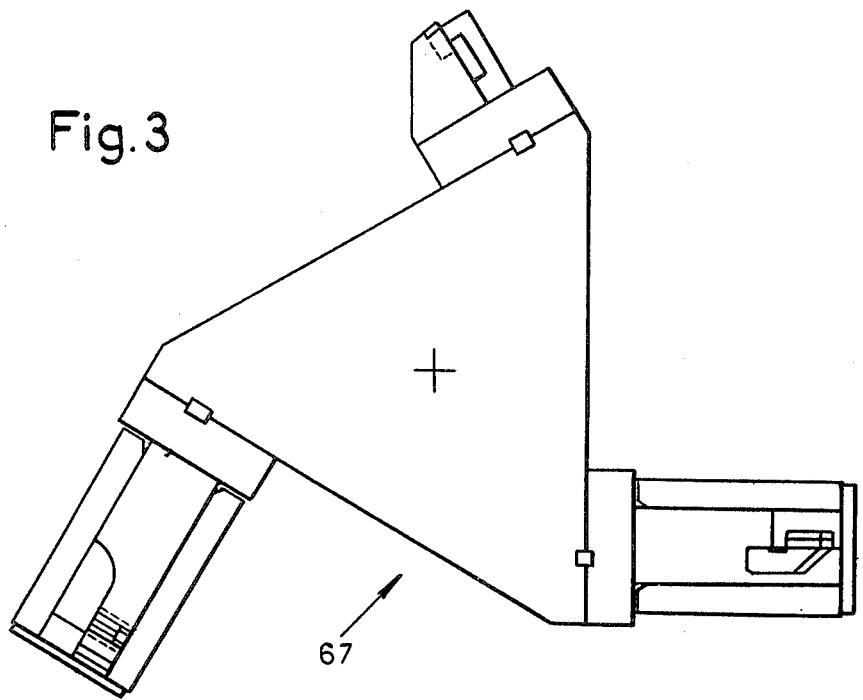
FIG. 3 is a front view of the support for several tool-holder bars, intended to be fixed on a lathe turret.
Figure 4:
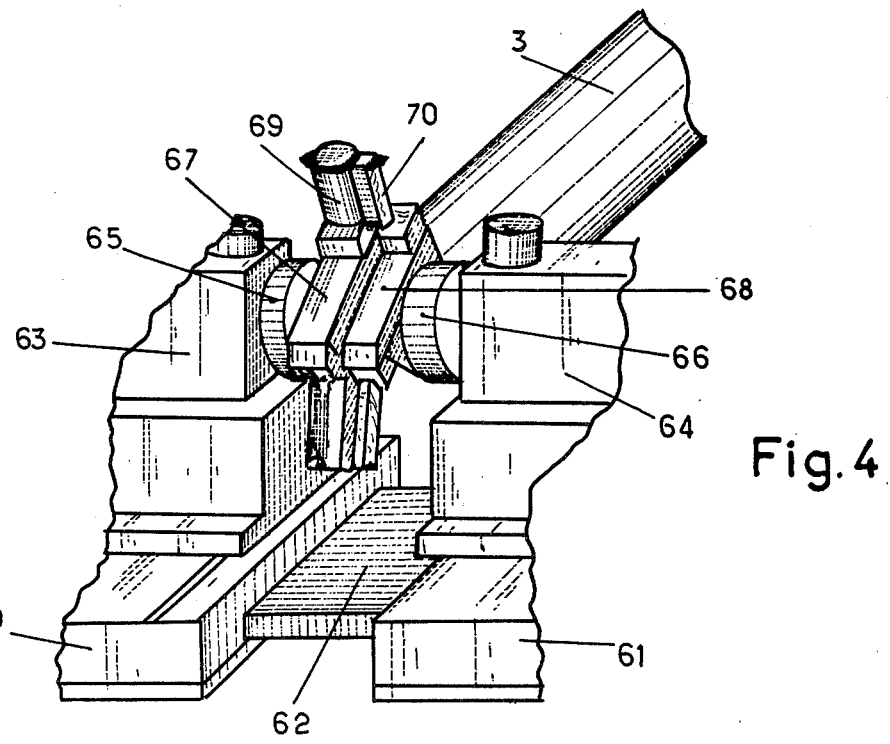
FIG. 4 is a simplified perspective view illustrating the application of such a support on a lathe fitted with rotary turrets.

In this particular example described here, there are three tools and the support has then a triangular shape, as can be more clearly seen in FIG. 3 which represents precisely one of these supports seen in a plan view. All these tools are mounted, of course, at the end of paired tool-holder bars of the kind shown in FIGS. 1 and 2.

In other words, each bar such as 69 of support 67 comprises a longitudinal channel in which there slidingly engages the heel of the corresponding bar 70 carried by the opposite support 68.

It will moreover be noticed that with such an arrangement, it is not necessary for both turrets to be motive. Thus, in the example described here, only turret 63 is motive and comprises the control elements for rotation, indexing, locking and for the free rotation position (unlocking). The other turret 64, a driven part, is simplified and only comprises the control elements for locking and for free rotation (unlocking). The rotation of the simplified turret 64 can in fact be provided from the main turret 63, through the paired tool-holder bars, which form a connection between the spindles of the two turrets.

Consequently, the spindle of the main turret 63 causes the spindle of the simplified turret 64 to rotate, whatever the position of the two transverse carriages, this of course within the limit of the transverse travel allowed, which depends on the depth of the channel provided in the tool-holder bars 69.

After indexing of the main turret 63, it is locked at the same time as the spindle of the simplified turret 64. At this time, the assembly moves longitudinally and each tool-holder bar effects its transverse travel to share the chip section to be removed, the two tools working opposite each other.

What is claimed is:

1. An improved lathe having a head-stock for supporting a workpiece on a rotational axis concentric with an interior surface of revolution in the workpiece to be machined, and cutting tool supporting means including a pair of carriages arranged symmetrically with respect to the rotational axis and movable longitudinally and transversely in parallel with a common plane passing through said axis; at least one tool-holder bar supported by each of said carriages and projecting generally parallel to said rotational axis, the cross-sectional configuration of at least one of said tool-holder bars defining a surface parallel to said common plane for supporting the other of said tool-holder bars, the improvement comprising: a longitudinal channel included in one of said tool-holder bars, said longitudinal channel having opposite faces which are parallel to said common plane; and a heel member disposed on the other tool-holder bar, said heel member being slidingly fitted within the logitudinal channel of the other tool-holder bar, said heel member including a pair of slide bearing surfaces for slidingly contacting the other tool-holder bar.

2. The lathe according to claim 1 including a pair of cutting tools supported respectively on said tool-holder bars so that the cutting edges of said tools will be positioned in a diametric plane inclined slightly with respect to said common plane.

3. A lathe according to claim 1, characterized in that the parallel opposed faces of the channel are provided with longitudinal grooves for lubricating under pressure said slide bearing surfaces.

4. A lathe according to claim 1, in which each of the transverse carriages is equipped with a rotary turret for supporting several tool-holder bars, said turrets having a common axis of rotation, one of said turrets being provided motive whereas the other, being simply a driven element, is rotated through the connection between bars.

5. A lathe according to claim 3, in which each of the transverse carriages is equipped with a rotary turret for supporting several tool-holder bars, said turrets having a common axis of rotation, one of said turrets being provided motive whereas the other, being simply a driven element, is rotated through the connection between bars.

* * * * *